(12) United States Patent
Richard et al.

(10) Patent No.: US 8,785,776 B2
(45) Date of Patent: Jul. 22, 2014

(54) METHODS AND SYSTEMS FOR COUPLING BUSWAY COMPONENTS

(75) Inventors: Steven English Richard, Selmer, TN (US); Mariusz Duda, Windsor Locks, CT (US)

(73) Assignee: General Electric Company, Schenectady, NY (US)

( * ) Notice: Subject to any disclaimer, the term of this patent is extended or adjusted under 35 U.S.C. 154(b) by 258 days.

(21) Appl. No.: 12/960,874

(22) Filed: Dec. 6, 2010

(65) Prior Publication Data

US 2012/0138331 A1   Jun. 7, 2012

(51) Int. Cl.
H02G 5/00 (2006.01)

(52) U.S. Cl.
USPC .................................................. 174/68.2

(58) Field of Classification Search
USPC ......... 174/68.2, 16.2, 68.1, 70 B, 71 B, 72 B, 174/88 B, 99 B, 129 B; 361/118, 659, 788
See application file for complete search history.

(56) References Cited

U.S. PATENT DOCUMENTS

| 3,446,911 | A | 5/1969 | Jorgensen |
| 3,786,394 | A | 1/1974 | Koenig et al. |
| 5,466,889 | A | 11/1995 | Faulkner et al. |
| 5,760,339 | A | 6/1998 | Faulkner et al. |
| 8,378,219 | B2 * | 2/2013 | Lesieur et al. ............ 174/129 B |
| 2004/0233605 | A1 * | 11/2004 | Dabrowski et al. ........... 361/118 |

OTHER PUBLICATIONS

European Office Action issued in European Application No. 11 19 1455 issued Jan. 20, 2014.

* cited by examiner

*Primary Examiner* — Tremesha S Willis
(74) *Attorney, Agent, or Firm* — General Electric Company

(57) ABSTRACT

An electrical power distribution system is described. The system includes a ground busbar including a first opening defined therein and a busway housing including a second opening defined therein. The system also includes a fastener sealing system that includes a fastener and at least one seal. The fastener is configured to extend through the first opening and the second opening and to couple the ground busbar to the busway housing. The ground busbar contacts the busway housing, forming a ground connection therebetween.

17 Claims, 4 Drawing Sheets

METHODS AND SYSTEMS FOR COUPLING BUSWAY COMPONENTS

BACKGROUND OF THE INVENTION

The field of the disclosure relates generally to electrical power distribution using a busway system, and more specifically, to methods and systems for coupling components within the busway system.

A busway system may be included within an electrical power distribution system. Busway systems typically include a plurality of busway sections joined together by joint sections to provide an appropriate length of busway. Busway systems are typically used in industrial or commercial buildings as an alternative to cable and conduit. Use of busway systems may decrease installation time and cost when compared to cable and conduit, and may also be a lower weight alternative to cable and conduit.

Tiebolts are used throughout the busway system to secure components within the busway system. For example, a tiebolt may be used to secure busway sections at the joint section. Each busway section includes a housing that protects an interior of the busway section. The tiebolt is inserted through an opening in the housing to, for example, secure a component to the housing and/or provide support to the housing. The interior of the busway section is susceptible to potential contamination at the opening from, for example, water or dust. Such contamination may damage components within the housing over time. Known busway electrical distribution systems include an aluminum washer positioned between, for example, a ground busbar and the housing. The aluminum washer provides a conductive path between the ground busbar and the housing, and since aluminum is relatively soft compared to the materials forming the housing and the ground busbar, the aluminum washer deforms to provide at least some sealing to prevent contaminants from entering the interior of the housing. However, over time, as other components used to couple and seal the tiebolt compress, for example, a gasket washer, and/or as the tiebolt loses torque over time, the force pressing together the ground busbar, aluminum washer, and housing is reduced. As the force is reduced, the aluminum washer does not expand to maintain the seal between the ground busbar and the housing, leaving a weak point in the busway system where contaminants may enter the housing.

BRIEF DESCRIPTION OF THE INVENTION

In one aspect, an electrical power distribution system is provided. The system includes a ground busbar including a first opening defined therein and a busway housing including a second opening defined therein. The system also includes a fastener sealing system that includes a fastener and at least one seal. The fastener is configured to extend through the first opening and the second opening and to couple the ground busbar to the busway housing. The ground busbar contacts the busway housing, forming a ground connection therebetween.

In another aspect, a tiebolt sealing system for coupling a ground busbar and a busway housing is provided. The ground busbar and the busway housing each include an opening defined therein. The system includes a fastener that includes a body and a restraining portion. The fastener body is configured to extend through the openings defined within the ground busbar and the busway housing. The system also includes at least one seal configured to extend at least partially around the fastener body and to be positioned at least partially within the opening defined within the ground busbar. The at least one seal is configured to seal the opening defined within the busway housing.

In yet another aspect, a method for coupling a ground busbar to a busway housing is provided. The ground busbar includes a first opening defined therein by a first edge and the busway housing includes a second opening defined therein by a second edge. The method includes configuring the ground busbar and the busway housing such that the first opening and the second opening align to define a single fastener opening and the ground busbar contacts the busway housing, providing an electrical ground connection therebetween. The method also includes configuring a fastener sealing system to maintain contact between the ground busbar and the busway housing. The fastener sealing system includes a fastener and at least one seal. The fastener is configured to extend through the fastener opening and the at least one seal is configured to prevent contaminants from passing through the fastener opening.

DETAILED DESCRIPTION OF THE INVENTION

The embodiments described herein include systems and methods for coupling components in a busway system. The systems and methods facilitate coupling components in a busway system while sealing an interior of the busway system from contaminants. The systems and methods also allow use of a proven seal plane while providing electrical ground contact between the components.

Figure 1:
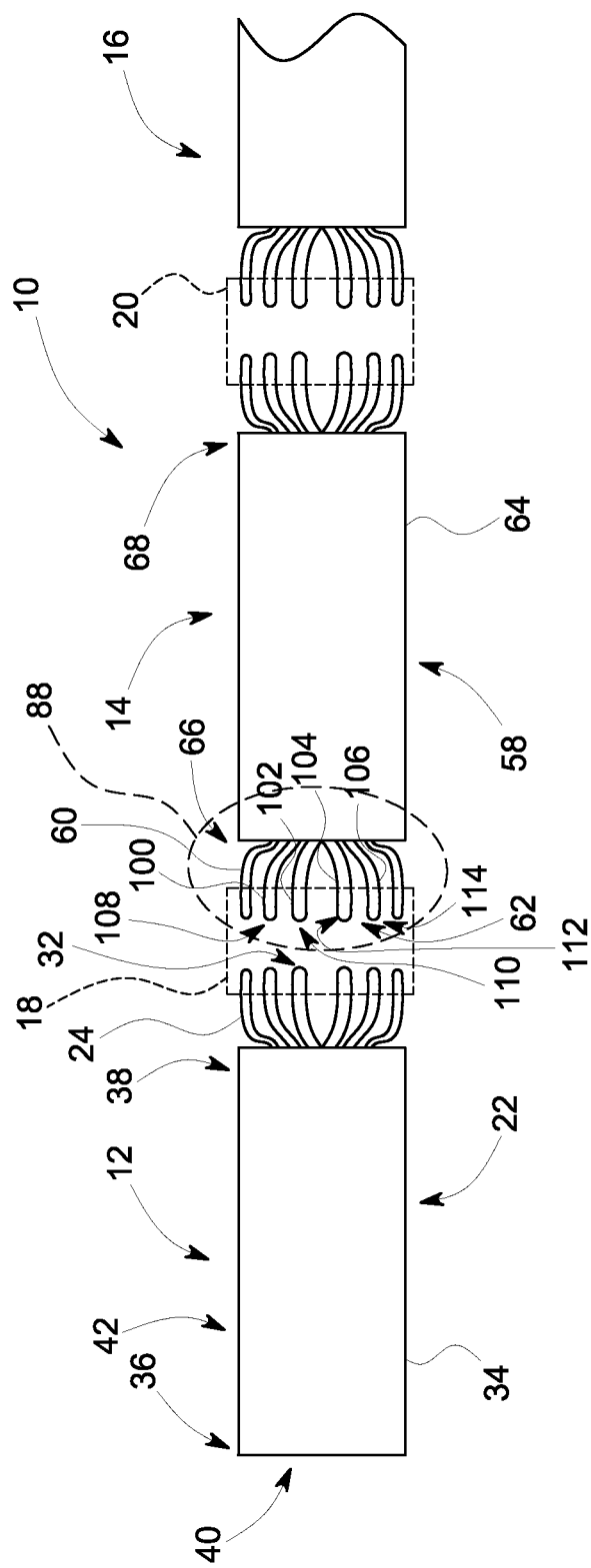
FIG. 1 is a side view of an exemplary embodiment of a busway electrical distribution system.

FIG. 1 is a side view of an exemplary embodiment of a busway electrical distribution system 10. Busway electrical distribution system 10 includes a first busway section 12, a second busway section 14, and a third busway section 16. First busway section 12 is coupled to second busway section 14 by a first joint 18. Similarly, second busway section 14 is coupled to third busway section 16 by a second joint 20. Joints for coupling busway sections are known in the art.

First busway section 12 includes multiple components, for example, a first component and a second component. A non-limiting example of the first component is a first busway body 22 and a non-limiting example of the second component is a ground conductor or ground busbar 24. In the exemplary embodiment, first busway body 22 includes a first plurality of conductors 32 and a first housing 34. The plurality of conductors 32, also referred to herein as busbars, extend from a first end 36 of housing 34 to a second end 38 of housing 34. Housing 34 defines an interior 40 of first busway section 12 and an exterior 42 of first busway section 12. Interior 40 of a busway section is defined herein as an area within the housing. The plurality of conductors 32 are at least partially contained within interior 40 of housing 34. Furthermore, ground busbar 24 is coupled to housing 34. Ground busbar 24 facilitates grounding between busway sections, for example, between first busway section 12 and second busway section 14.

Second busway section 14 also includes multiple components. For example, second busway section 14 includes a second busway body 58 and a ground busbar 60. In the exemplary embodiment, second busway body 58 includes a second plurality of conductors 62 and a second housing 64. The plurality of conductors 62, also referred to herein as busbars, extend from first end 66 of housing 64 to a second end 68 of housing 64. The plurality of conductors 62 are at least partially contained within interior 40 of housing 64. Furthermore, ground busbar 60 is coupled to housing 64 and facilitates grounding of busway sections 12 and 14.

Joint 18 couples first busway section 12 and second busway section 14. More specifically, joint 18 couples first plurality of conductors 32 to second plurality of conductors 62. Joint 18 also couples ground busbar 24 to ground busbar 60, ensuring proper grounding between first busway section 12 and second busway section 14. In an alternative embodiment, a single ground busbar (not shown in FIG. 1) extends between second end 38 of first housing 34 and first end 66 of second housing 64, and is coupled to first housing 34 and second housing 64.

The methods and systems described herein facilitate coupling a first component and a second component, for example, ground busbar 24 to first housing 34. However, the methods and systems described herein may also be used to couple other components within busway system 10, such as, but not limited to, joint 18 and first plurality of conductors 32, joint 18 and second plurality of conductors 62, and/or a busway housing to a support structure (e.g., floor, wall, ceiling, and/or hangar).

Figure 2:
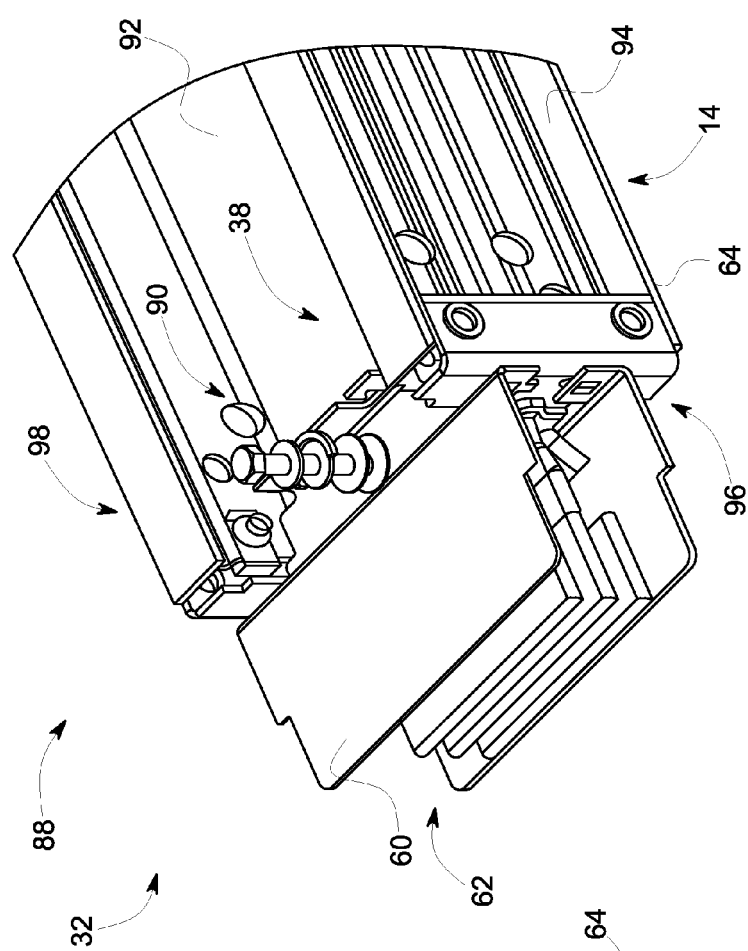
FIG. 2 is a perspective view of a portion of the busway electrical distribution system shown in FIG. 1.
Figure 3:
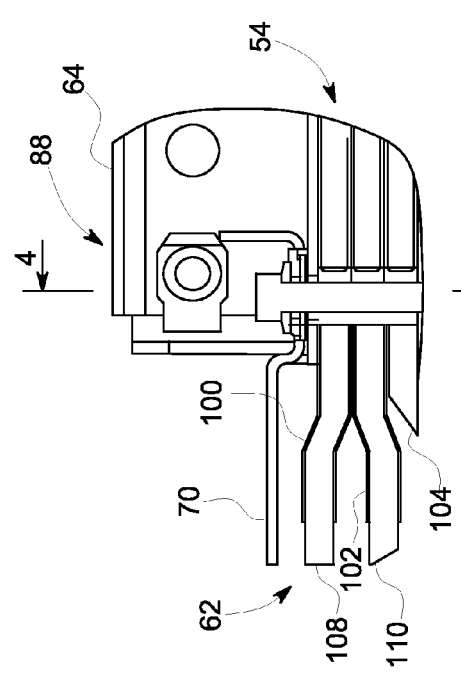
FIG. 3 is a side view of the portion of the busway electrical distribution system shown in FIG. 2.

FIG. 2 is a perspective view of a portion 88 of busway system 10 (shown in FIG. 1). FIG. 3 is a side view of portion 88. Components shown in both FIG. 2 and FIG. 3 are identified with identical reference numerals. In the exemplary embodiment, busway system 10 includes a fastener sealing system 90. In the exemplary embodiment, fastener sealing system 90 secures a first busway component to a second busway component, for example, ground busbar 60 to second housing 64. Housing 64 includes a first panel 92, a second panel 94, a third panel 96, and a fourth panel 98. Although described as including four panels 92, 94, 96, and 98, housing 64 may include any number of panels suitable to define interior 40.

In the exemplary embodiment, plurality of conductors 62 includes a first busbar 100, a second busbar 102, a third busbar 104, and a fourth busbar 106 (shown in FIG. 1). First busbar 100 includes a first busbar end 108, second busbar 102 includes a second busbar end 110, third busbar 104 includes a third busbar end 112 (shown in FIG. 1), and fourth busbar 106 includes a fourth busbar end 114 (shown in FIG. 1). Although described as including four busbars 100, 102, 104, and 106, plurality of conductors 62 may include any suitable number of busbars that allows system 10 to function as described herein.

Figure 4:
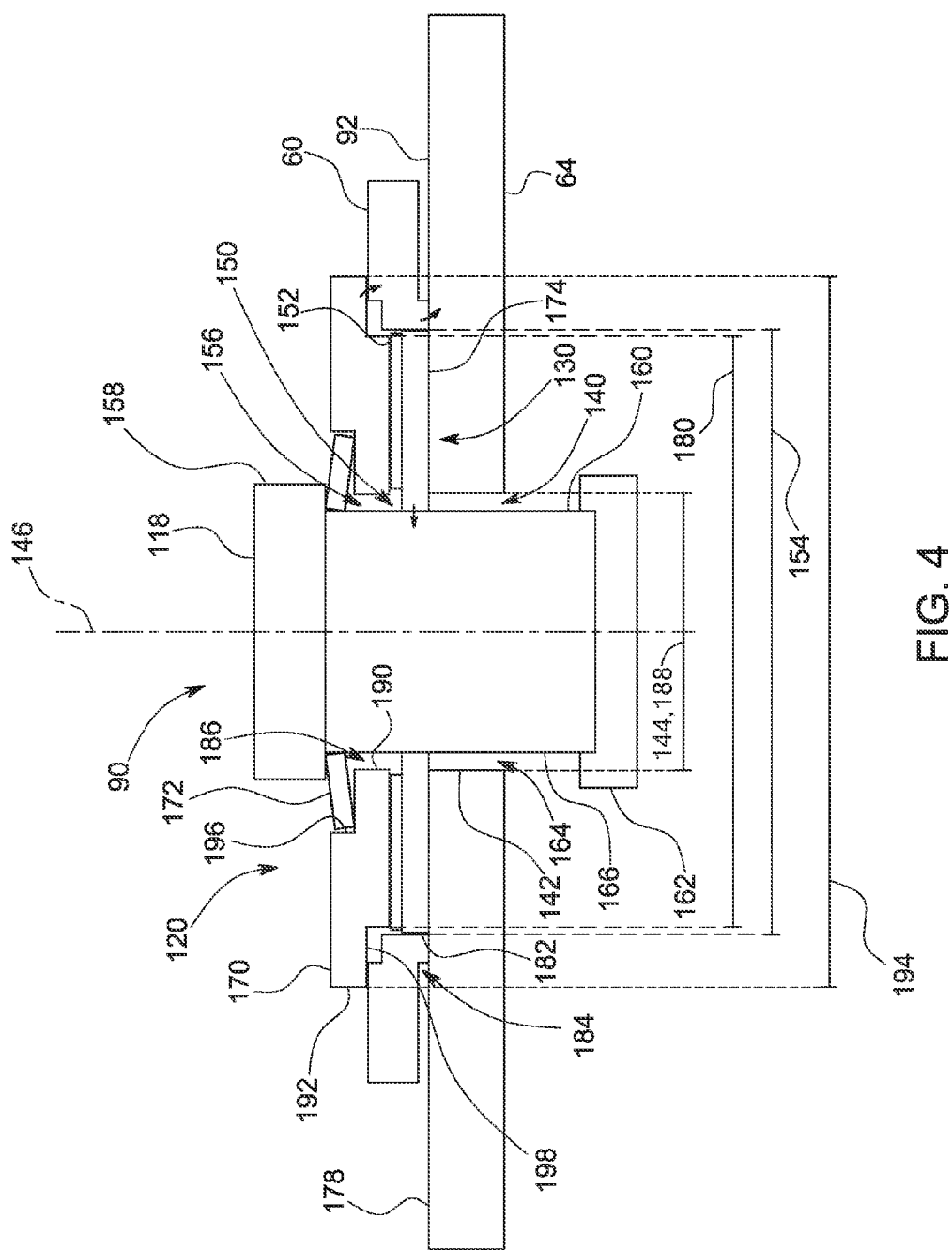
FIG. 4 is a cross-sectional side view of the first component, the busway housing, and the fastener sealing system shown in FIG. 2.

FIG. 4 is a cross-sectional view of second busway housing 64, ground busbar 60, and fastener sealing system 90 taken along lines 4-4 (shown in FIG. 3). In the exemplary embodiment, fastener sealing system 90 includes a fastener 118, a spacing device 120, and a sealing device 130. Alternatively, fastener sealing system 90 may include more than one spacing device 120 and/or sealing device 130. In the exemplary embodiment, busway housing 64 includes a first opening 140 defined within first panel 92 by a first edge 142. Opening 140 has an outer diameter 144. In the exemplary embodiment, opening 140 is substantially circular and is centered about a fastener axis 146. Ground busbar 60 includes a second opening 150 defined therein by a second edge 152. Opening 150 has an outer diameter 154. First opening 140 and second opening 150 align to form a fastener opening 156, configured to receive fastener 118. In the exemplary embodiment, fastener 118 is a threaded fastener that includes a restraining portion 158 and a fastener body 160 configured for coupling with a complementary fastening member 162. For example, fastener 118 may be a tiebolt configured for coupling with a nut, a threaded opening within a surface, or any other fastening member that allows fastener sealing system 90 to function as described herein. When fastener 118 is positioned through opening 156, a gap 164 is present between an outer surface 166 of fastener 118 and first edge 142 of housing 64. Gap 164 allows fastener 118 to be inserted through opening 140 and may vary depending upon manufacturing tolerances of fastener 118 and/or opening 140 within housing 64.

As described herein, "sealing" is defined as preventing contaminants from entering interior 40 of busway housing 64. Such contaminants typically enter busway housing 64 through spaces around fasteners, for example, gap 164. Fastener sealing system 90 is configured to secure ground busbar 60 to second busway body 58 and to prevent contaminants, such as but not limited to, water and dust, from reaching interior 40 of busway housing 64 from exterior 42 of busway housing 64. Sealing device 130 seals gap 164 between fastener 118 and opening 140 such that contaminants are prevented from entering housing 64. Furthermore, levels of protection provided against intrusion of water and other contaminants are defined in international standards, for example, international standards promulgated by the International Electrotechnical Commission (IEC). In a specific example, a busway system installed exterior to a structure (i.e., exposed to elements such as wind, rain, and/or snow) may be manufactured to meet an International Protection Rating, also referred to as an IP Code, of IP65. A rating of IP65 is achieved if the seal is "dust tight," that is, the interior is completely protected against contact with dust, and the seal protects the interior from harmful effects caused by water projected in powerful jets against the enclosure from any direction. Although IP65 is described, fastener sealing system 90 is not limited to a specific seal rating.

In the exemplary embodiment, spacing device 120 includes a compression spacer 170 and a spring washer 172. Sealing device 130 includes a gasketed washer 174 that directly contacts an exterior surface 178 of first panel 92 to provide a seal. Although described herein as including a gasketed washer, sealing device 130 may include any type of seal or sealant, for example, but not limited to, a liquid sealant.

In the exemplary embodiment, opening 150 extending through ground busbar 60 is configured to receive gasketed washer 174. More specifically, gasketed washer 174 has an outer diameter 180 that is less than diameter 154 of second opening 150. Gasketed washer 174 is positioned within opening 150 such that a radially outward surface 182 of gasketed washer 174 is positioned against edge 152 of ground busbar 60. At least a portion of ground busbar 60 and gasketed washer 174 directly contact housing 64. For example, ground busbar 60 includes a projection 184, for example, a half-shear bump, which provides a direct ground path between ground busbar 60 and housing 64.

In the exemplary embodiment, compression spacer 170 includes an opening 186 having an inner diameter 188 defined by a first end 190. Compression spacer 170 also includes a second end 192 that has an outer diameter 194. Compression spacer 170 includes a first notch 196 positioned at first end 190 and configured to receive at least a portion of spring washer 172. Compression spacer 170 also includes a second notch 198 positioned at second end 192 and configured to receive at least a portion of ground busbar 60, for example, second edge 152.

In the exemplary embodiment, a force applied to fastener 118 during assembly of busway system 10 is applied to ground busbar 60 and to gasketed washer 174 through compression spacer 170. For example, a torque applied to a threaded fastener is converted to a compression force. The compression force compresses gasketed washer 174 and secures contact between ground busbar 60 and housing 64. More specifically, the compression force is applied to spring washer 172 and gasketed washer 174 is compressed by compression spacer 170 to the greatest extent at first end 190. Furthermore, the compression force applied to spring washer 172 is transmitted through compression spacer 170 to ground busbar 60 at second notch 198. First notch 196 and second notch 198 are configured to facilitate transferring compression force to properly seal gap 164 and to maintain contact between ground busbar 60 and housing 64.

Furthermore, compression spacer 170 maintains the compression force on gasketed washer 174 and maintains the ground path between busway housing 64 and ground busbar 60 even when fastener torque has decreased. Compression spacer 170 is also utilized to control an amount of compression on gasketed washer 174. Spring washer 172 is positioned between compression spacer 170 and restraining portion 158 of fastener 118 to facilitate maintaining torque on fastener 118. Gasketed washer 174 is configured to provide an optimum seal at a predefined compression force. This force is applied to gasketed washer 174 during assembly. However, even as torque on fastener 118 decreases over time, gasketed washer 174 maintains the seal. For example, fastener 118 may have an initial torque of fifteen foot-pounds. Unlike other seals, for example, an aluminum washer, gasketed washer 174 maintains the seal even if the torque from fastener 118 is reduced to, for example, three foot-pounds.

Figure 5:
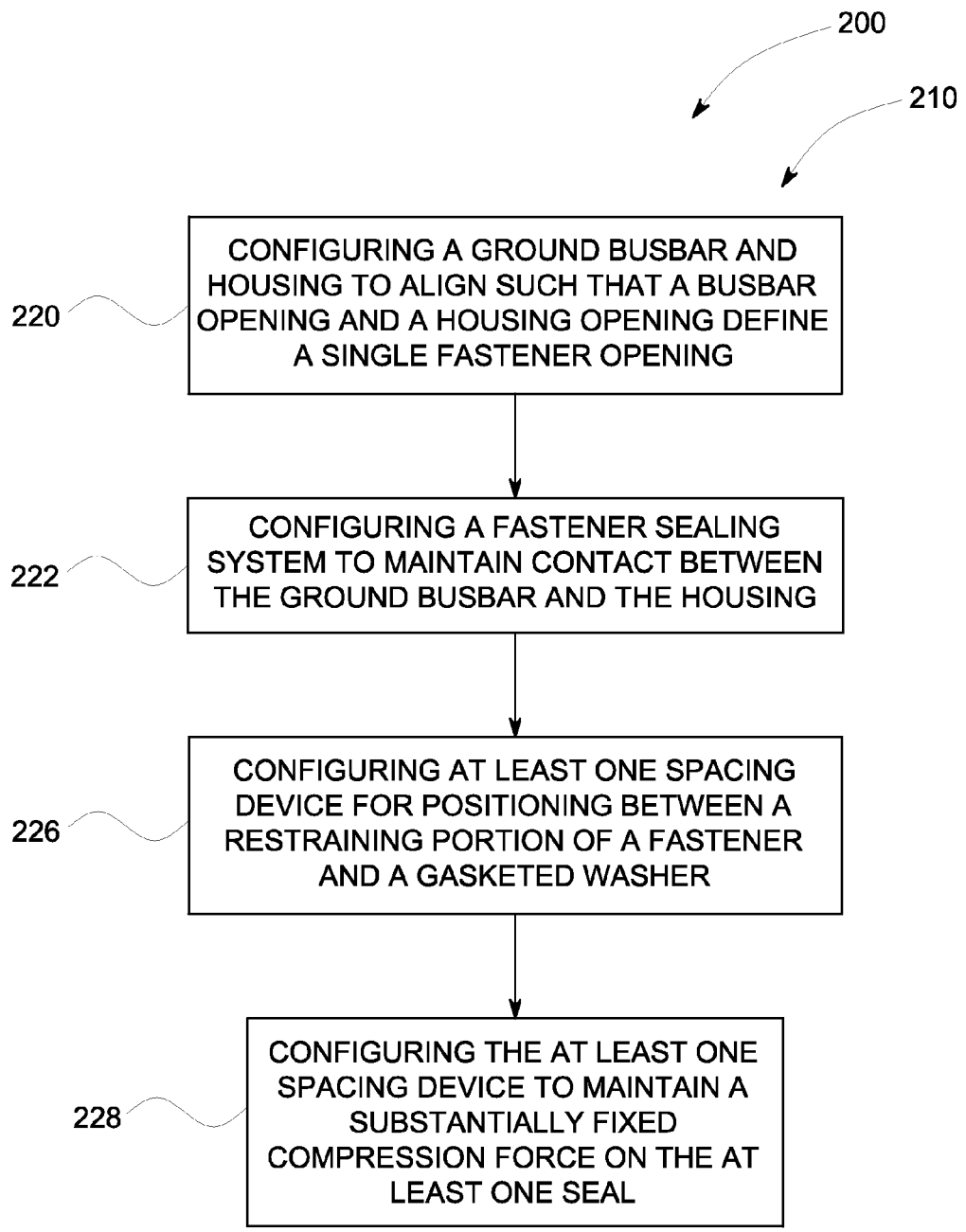
FIG. 5 is a flow chart of an exemplary method for coupling a first busway component to a second busway component using the fastener sealing system shown in FIG. 2.

FIG. 5 is a flow chart 200 of an exemplary method 210 for coupling a first busway component to a second busway component, for example, ground busbar 60 (shown in FIG. 2) to housing 64 (shown in FIG. 2). As described above, housing 64 includes first opening 140 (shown in FIG. 4) defined therein and ground busbar 60 includes second opening 150 (shown in FIG. 4) defined therein. In the exemplary embodiment, method 210 includes configuring 220 ground busbar 60 and housing 64 to align such that first opening 140 and second opening 150 define a single fastener opening, for example, fastener opening 156. Configuring 220 further includes configuring ground busbar 60 to contact housing 64, which provides an electrical ground connection therebetween. Method 210 further includes configuring 222 a fastener sealing system, for example, fastener sealing system 90 (shown in FIG. 2) to secure ground busbar 60 to housing 64. Fastener sealing system 90 includes a fastener, for example, fastener 118 (shown in FIG. 4) and at least one seal device, for example, gasketed washer 174 (shown in FIG. 4). Configuring 222 includes configuring fastener 118 to extend through fastener opening 156 and configuring gasketed washer 174 to prevent contaminants from passing through opening 156.

In the exemplary embodiment, method 210 may also include configuring 226 at least one spacing device, for example, spacing device 120 (shown in FIG. 4) for positioning between restraining portion 158 of fastener 118 and gasketed washer 174. Fastener 118 is configured to secure ground busbar 60 to housing 64 and compress spacing device 120 and gasketed washer 174. Method 210 may also include configuring 228 spacing device 120 to maintain a substantially fixed compression force on gasketed washer 174.

Described herein are exemplary methods and systems for coupling a first busway component to a second busway component. More specifically, the methods and systems described herein facilitate eliminating leakage in tiebolts closest to the joints while maintaining the necessary ground path contact. Also, by positioning the gasketed washer along a surface of the housing, the gasketed washer permanently deforms to create a seal with the busway housing. Since the gasketed washer rests directly against the busway housing it is able to flow slightly into the tiebolt hole as well as around the tiebolt. This deforms the gasketed washer permanently, which creates a durable seal. Tiebolts tend to lose their torque over time, however, the methods and systems described herein facilitate maintaining the seal even as the torque decreases. The methods and systems described herein also provide a direct ground path connection between a ground busbar and a busway housing.

The methods and systems described herein facilitate efficient and economical manufacture and assembly of a busway based electrical distribution network. Exemplary embodiments of methods and systems are described and/or illustrated herein in detail. The methods and systems are not limited to the specific embodiments described herein, but rather, components of each system, as well as steps of each method, may be utilized independently and separately from other components and steps described herein. Each component, and each method step, can also be used in combination with other components and/or method steps.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electrical power distribution system comprising:
   a ground busbar including a first opening defined therein;
   at least one first busbar;
   a busway housing including a second opening defined therein, said at least one first busbar positioned at least partially within an interior defined by said busway housing; and
   a fastener sealing system comprising a fastener, a spacing device, and at least one seal, said fastener comprising a restraining portion and a fastener body configured to extend through said first opening and said second opening, said spacing device positioned between said restraining portion and said at least one seal, said fastener configured to couple said ground busbar to said busway housing, said ground busbar contacting said busway housing and forming a ground connection therebetween, said spacing device comprising a compression spacer configured to compress said at least one seal and maintain the ground connection between said ground busbar and said busway housing, and said spacing device and said at least one seal positioned exterior to said busway housing.

2. A system in accordance with claim 1 wherein said at least one seal is configured to reduce contaminant ingress through at least one of said first opening and said second opening.

3. A system in accordance with claim 1 wherein said fastener is configured to apply a compression force on said spacing device.

4. A system in accordance with claim 3 wherein said fastener comprises a threaded fastener and a cooperating member configured to convert torque applied to said fastener to the compression force on said spacing device.

5. A system in accordance with claim 3 wherein said spacing device further comprises a spring washer.

6. A system in accordance with claim 5 wherein said spacing device maintains a substantially fixed compression force on said at least one seal.

7. A system in accordance with claim 5 wherein said spacing device comprises a first notch and a second notch, said first notch configured to receive at least a portion of said spring washer and said second notch configured to receive at least a portion of said ground busbar.

8. A tiebolt sealing system for coupling a ground busbar and a busway housing, the ground busbar and the busway housing each comprising an opening defined therein, said system comprising:
  a fastener comprising a body and a restraining portion, said fastener body configured to extend through the openings defined within the ground busbar and the busway housing;
  at least one first busbar positioned at least partially within an interior defined by the busway housing;
  at least one seal configured to extend at least partially around said fastener body and to be positioned at least partially within the opening defined within the ground busbar, said at least one seal configured to seal the opening defined within the busway housing; and
  at least one spacing device positioned between said restraining portion and said at least one seal, said spacing device comprising a compression spacer configured to compress said at least one seal and maintain contact between the ground busbar and the busway housing, and said spacing device and said at least one seal positioned exterior to the busway housing.

9. A system in accordance with claim 8 wherein said at least one spacing device is positioned between said restraining portion and the ground busbar.

10. A system in accordance with claim 9 wherein said at least one spacing device further comprises a spring washer.

11. A system in accordance with claim 10 wherein the contact between the busway housing and the ground busbar provides a ground path between the busway housing and the ground busbar.

12. A system in accordance with claim 9 wherein said fastener comprises a threaded fastener and a cooperating member configured to convert torque applied to said fastener to a compression force on said at least one spacing device.

13. A system in accordance with claim 12 wherein said at least one spacing device is configured to maintain a substantially fixed compression force on said at least one seal.

14. A method for coupling a ground busbar to a busway housing, the ground busbar including a first opening defined therein by a first edge and the busway housing including a second opening defined therein by a second edge, said method comprising:
  configuring the ground busbar and the busway housing such that the first opening and the second opening align to define a single fastener opening and the ground busbar contacts the busway housing, providing an electrical ground connection therebetween;
  configuring at least one first busbar and the busway housing such that the at least one first busbar is positioned at least partially within an interior defined by the busway housing;
  configuring a fastener sealing system to maintain contact between the ground busbar and the busway housing, the fastener sealing system including at least one seal and a fastener including a restraining portion, the fastener configured to extend through the fastener opening and the at least one seal configured to prevent contaminants from passing through the fastener opening; and
  configuring at least one spacing device for positioning between the restraining portion and the at least one seal, the spacing device including a compression spacer configured to compress the at least one seal and maintain contact between the ground busbar and the busway housing, and the spacing device and the at least one seal positioned exterior to the busway housing.

15. A method in accordance with claim 14 further comprising configuring the ground busbar to receive the at least one seal at least partially within the first opening, and to position the at least one seal radially inward from the first edge.

16. A method in accordance with claim 15 further comprising configuring the at least one seal for positioning between the first edge and the fastener.

17. A method in accordance with claim 14 further comprising configuring the at least one spacing device to maintain a substantially fixed compression force on the at least one seal.

* * * * *